(12) United States Patent
Oh et al.

(10) Patent No.: US 9,578,349 B2
(45) Date of Patent: *Feb. 21, 2017

(54) IMAGE DECODING APPARATUS ADAPTIVELY DETERMINING A SCAN PATTERN ACCORDING TO AN INTRA PREDICTION MODE

(71) Applicant: M&K HOLDINGS INC., Seoul (KR)

(72) Inventors: Soo Mi Oh, Gyeonggi-do (KR); Moonock Yang, Singapore (SG)

(73) Assignee: M&K HOLDINGS INC., Seoul (KR)

(*) Notice: Subject to any disclaimer, the term of this patent is extended or adjusted under 35 U.S.C. 154(b) by 0 days.

This patent is subject to a terminal disclaimer.

(21) Appl. No.: 15/067,627

(22) Filed: Mar. 11, 2016

(65) Prior Publication Data

US 2016/0198186 A1 Jul. 7, 2016

Related U.S. Application Data

(63) Continuation of application No. 13/624,826, filed on Sep. 21, 2012, now Pat. No. 9,319,715, which is a
(Continued)

(30) Foreign Application Priority Data

Jul. 31, 2010 (KR) .................. 10-2010-0074462
Jun. 28, 2011 (KR) .................. 10-2011-0062603

(51) Int. Cl.
*H04N 19/176* (2014.01)
*H04N 7/26* (2006.01)
(Continued)

(52) U.S. Cl.
CPC ............ *H04N 19/593* (2014.11); *H04N 19/11* (2014.11); *H04N 19/117* (2014.11);
(Continued)

(58) Field of Classification Search
CPC .... H04N 19/61; H04N 19/176; H04N 19/129; H04N 19/11; H04N 19/593; H04N 19/105; H04N 19/122; H04N 19/159; H04N 19/18
See application file for complete search history.

(56) References Cited

U.S. PATENT DOCUMENTS

| 6,148,109 A | * | 11/2000 | Boon | .............. H04N 19/619 375/E7.133 |
| 2008/0310512 A1 | * | 12/2008 | Ye | .............. H04N 19/00812 375/240.16 |

(Continued)

FOREIGN PATENT DOCUMENTS

| CN | 1665301 | 9/2005 |
| EP | 2 557 797 | 2/2013 |

(Continued)

OTHER PUBLICATIONS

Lai et al., "New intra prediction using the correlation between pixels and lines", JCT-VC (Joint Collaborative Team on Video Coding of ITU-T SG16 WP3 and ISO/IEC JTC1/SC29/WG11) 1. Dresden, Germany, Apr. 15-23, 2010, No. JCTVC-A025.

(Continued)

*Primary Examiner* — Dave Czekaj
*Assistant Examiner* — Alison Slater
(74) *Attorney, Agent, or Firm* — Mintz Levin Cohn Ferris Glovsky and Popeo, P.C.; Kongsik Kim; Jonathon Western

(57) ABSTRACT

Provided is an image decoding apparatus that receives an intra prediction mode and one-dimensional (1D) quantized coefficients, restores a quantized transform block by inversely scanning the 1D quantized coefficients, inversely quantizes the quantized transform block using a quantization step size to generate a transform block, inversely transforms the transform block to generate a residual block, and gen-
(Continued)

erates a prediction block according to the intra prediction mode. When a size of the transform block is 8×8, the quantized transform block is divided into a plurality of sub-blocks, and the plurality of sub-blocks and coefficients of each sub-block are scanned using a same scan pattern determined according to the intra prediction mode. When the intra prediction mode is a horizontal mode, the scan pattern is a vertical scan.

4 Claims, 6 Drawing Sheets

Related U.S. Application Data continuation of application No. PCT/KR2011/005592, filed on Jul. 29, 2011.

(51) Int. Cl.

| | | |
|---|---|---|
| H04N 7/32 | (2006.01) | |
| H04N 19/61 | (2014.01) | |
| H04N 19/91 | (2014.01) | |
| H04N 19/11 | (2014.01) | |
| H04N 19/593 | (2014.01) | |
| H04N 19/159 | (2014.01) | |
| H04N 19/117 | (2014.01) | |
| H04N 19/82 | (2014.01) | |
| H04N 19/124 | (2014.01) | |
| H04N 19/129 | (2014.01) | |
| H04N 19/119 | (2014.01) | |
| H04N 19/122 | (2014.01) | |
| H04N 19/18 | (2014.01) | |
| H04N 19/182 | (2014.01) | |
| H04N 19/44 | (2014.01) | |

(52) U.S. Cl.
CPC ......... *H04N 19/119* (2014.11); *H04N 19/122* (2014.11); *H04N 19/124* (2014.11); *H04N 19/129* (2014.11); *H04N 19/159* (2014.11); *H04N 19/176* (2014.11); *H04N 19/18* (2014.11); *H04N 19/182* (2014.11); *H04N 19/44* (2014.11); *H04N 19/61* (2014.11); *H04N 19/82* (2014.11); *H04N 19/91* (2014.11)

(56) References Cited

U.S. PATENT DOCUMENTS

| | | | | |
|---|---|---|---|---|
| 2010/0118971 | A1* | 5/2010 | Tanida ............... | H03M 7/30 375/240.23 |
| 2011/0206135 | A1* | 8/2011 | Drugeon ............. | H04N 19/176 375/240.24 |
| 2011/0243230 | A1 | 10/2011 | Liu | |

FOREIGN PATENT DOCUMENTS

| | | |
|---|---|---|
| JP | 2005512419 | 4/2005 |
| JP | 2006-54846 | 2/2006 |
| JP | 2007-124564 | 5/2007 |
| JP | 2007-300389 | 11/2007 |
| JP | 2009-27541 | 2/2009 |
| JP | 2013-524707 | 6/2013 |
| KR | 10-2004-0007139 | 1/2004 |
| KR | 10-0570488 | 4/2006 |
| KR | 10-2007-0005848 | 1/2007 |
| KR | 10-0798446 | 1/2008 |
| KR | 10-2008-0071940 | 8/2008 |
| KR | 10-0868476 | 11/2008 |
| KR | 10-2010-0037180 | 4/2010 |
| WO | WO-03/105070 | 12/2003 |
| WO | WO-2007/046644 | 4/2007 |
| WO | WO-2007/063808 | 6/2007 |
| WO | WO-2009/080133 | 7/2009 |

OTHER PUBLICATIONS

Lai et al., "New intra prediction using the correlation between pixels and lines", JCT-VC (Joint Collaborative Team on Video Coding of ITU-T SG16 WP3 and ISO/IEC JTC1SC29/WG11, 2. Geneva, Switzerland, Jul. 21-28, 2010, No. JCTVC-B040.

Zheng et al., "Simplified Intra Smoothing", JCT-VC (Joint Collaborative Team on Video Coding of ITU-T SG16 WP3 and ISO/IEC JTC1/SC29/WG11) 3. Guangzhou, China, Oct. 7-15, 2010, No. JCTVC-C234.

Sugimoto et al., "LUT-based adaptive filtering on intra prediction samples", JCT-VC (Joint Collaborative Team on Video Coding of ITU-T SG16 WP3 and ISO/IEC JTC1/SC29/WG11) 4. Daegu, Republic of Korea, Jan. 20-28, 2011, No. JCTVC-D109.

Sjoberg et al., "BoG report on padding of unavailable reference samples for intra prediction", JCT-VC (Joint Collaborative Team on Video coding of ITU-T SG16 WP3 and ISO/IEC JTC1/SC29/WG) 5. Geneva, Switzerland, Mar. 16-23, 2011, No. JCTVC-E488.

Zheng et al., "CE13: Mode Dependent Hybrid Intra Smoothing", JCT-VC (Joint Collaborative Team on Video coding of ITU-T SG16 WP3 and ISO/IEC JTC1/SC29/WG11), 4. Daegu, Republic of Korea, Jan. 20-28, 2011, No. JCTVC-D282.

Wiegand et al., "WD2: Working Draft 2 of High-Efficiency Video Coding", JCT-VC (Joint Collaborative Team on Video Coding of ITU-T SG16 WP3 and ISO/IEC JTC1/SC29/WG11) 4. Daegu, Republic of Korea, Jan. 20-28, 2011, No. JCTVC-D503.

Fan et al., "A Novel Coefficient Scanning Scheme for Directional Spatial Prediction-Based Image Compression", ICME 2003.

Winken et al., "Description of video coding technology proposal by Fraunhofer HHI", JCT-VC (Joint Collaborative Team on Video Coding of ITU-T SG16 WP3 and ISO/IEC JTC1/SC29/WG11) 1. Dresden, Germany, Apr. 15-23, 2010, No. JCTVC-A116.

Wiegand et al., "Overview of the H.264/VC Video Coding Standard", IEEE Transactions on Circuits and Systems for Video Technology, vol. 13, No. 7, Jul. 2003.

Kim et al., "Description of video coding technology proposal by ETRI", JCT-VC (Joint Collaborative Team on Video Coding of ITU-T SG16 WP3 and ISO/IEC JTC1/SC29/WG11) 1. Dresden, Germany, Apr. 15-23, 2010, No. JCTVC-A127.

Anonymous, "Test Model under Consideration", JCT-VC (Joint Collaborative Team on Video Coding of ITU-T SG16 WP3 and ISO/IEC JTC1/SC29/WG11) 2. Geneva, Switzerland, Jul. 21-28, 2010, No. JCTVC-B205.

Yeo et al., "Mode-Dependent Coefficient Scanning for Intra Prediction Residual Coding", JCT-VC (Joint Collaborative Team on Video Coding of ITU-T SG16 WP3 and ISO/IEC JTC1/SC29/WG11) 4. Daegu, Korea, Jan. 20-28, 2011, No. JCTVC-D049.

Sugimoto et al., "CE6.f: LUT-based adaptive filtering on intra prediction samples", JCT-VC (Joint Collaborative Team on Video Coding of ITU-T SG16 WP3 and ISO/IEC JTC1/SC29/WG11) 5. Geneva, Switzerland, Mar. 16-23, 2011, No. JCTVC-E069.

Karczewicz et al., "Video coding technology proposal by Qualcomm Inc.", JCT-VC (Joint Collaborative Team on Video Coding of ITU-T SG16 WP3 and ISO/IEC JTC1/SC29/WG11) 1. Dresden, Germany, Apr. 15-23, 2010, No. JCTVC-A121.

Seregin et al., "Low-complexity adaptive coefficients scanning", JCT-VC (Joint Collaborative Team on Video Coding of ITU-T SG16 WP3 and ISO/IEC JTC1/SC29/WG11) 3. Guangzhou, China, Oct. 7-15, 2010, No. JCTVC-C205.

Davies, "Unified scan processing for high efficiency coefficient coding", JCT-VC (Joint Collaborative Team on Video Coding of ITU-T SG16 WP3 and ISO/IEC JTC1/SC29/WG11) 4. Daegu, Korea, Jan. 20-28, 2011, No. JCTVC-D219.

Auyeung et al., "Parallel processing friendly simplified context selection of significance map", JCT-VC (Joint Collaborative Team on Video Coding of ITU-T SG16 WP3 and ISO/IEC JTC1/SC29/WG11) 4. Daegu, Korea, Jan. 20-28, 2011, No. JCTVC-D260.

(56) References Cited

OTHER PUBLICATIONS

Seregin et al., "CE11: Low-complexity adaptive coefficients scanning", JCT-VC (Joint Collaborative Team on Video Coding of ITU-T SG16 WP3 and ISO/IEC JTC1/SC29/WG11) 4. Daegu, Korea, Jan. 20-28, 2011, No. JCTVC-D360.

Sole et al., "Unified scans for the significance map and coefficient level coding in high coding efficiency", JCT-VC (Joint Collaborative Team on Video Coding of ITU-T SG16 WP3 and ISO/IEC JTC1/SC29/WG11) 5. Geneva, Switzerland, Mar. 16-23, 2011, No. JCTVC-E335.

Sze et al., "Description of Core Experiment (CE11): Coefficient scanning and coding", JCT-VC (Joint Collaborative Team on Video Coding of ITU-T SG16 WP3 and ISO/IEC JTC1/SC29/WG11) 5. Geneva, Switzerland, Mar. 16-23, 2011, No. JCTVC-E711.

International Telecommunication Union, ITU-T H.264, Telecommunication Standardization Sector of ITU, Series H: Audiovisual and Multimedia Systems—Infrastructure of audiovisual services—Coding of moving video, "Advanced video coding for generic audiovisual services", Mar. 2005.

Tsukuba et al., "Adaptive Multidirectional Intra Prediction", ITU—Telecommunications Standardization Sector Study Group 16 Question 6, Video Coding Experts Group (VCEG), 33. Shenzhen, China Oct. 20, 2007, VCEG-AG05.

Chien et al., "Parsing friendly intra mode coding", JCT-VC (Joint Collaborative Team on Video Coding of ITU-T SG16 WP3 and ISO/IEC JTC1/SC29/WG11) 6. Torino, Italy, Jul. 14-22, 2011, No. JCTVC-F459.

Tabatabai et al., "CE6: Intra Coding Improvements", JCT-VC (Joint Collaborative Team on Video Coding of ITU-T SG16 WP3 and ISO/IEC JTC1/SC29/WG11) 6. Torino, Italy, Jul. 14-22, 2011, No. JCTVC-F906.

Shay Har-Noy et al., "Adaptive In-Loop Prediction Refinement for Video Coding", IEEE 9th Workshop on Multimedia Signal Processing, MMSP 2007, Piscataway, NJ, USA, Oct. 1, 2007 (Oct. 1, 2007), pp. 171-174. XP031224804, ISBN: 978-1-4244-1274-7.

Anonymous, "Test Model under Consideration", JCT-VC (Joint Collaborative Team on Video Coding of ITU-T SG16 WP3 and ISO/IEC JTC1/SC29/WG11) 1. Dresden, Germany, Apr. 15-23, 2010, No. JCTVC-A205.

Zheng et al., "CE11: Mode Dependent Coefficient Scanning", JCT-VC (Joint Collaborative Team on Video Coding of ITU-T SG16 WP3 and ISO/IEC JTC1/SC29/WG11), 4. Daegu, Republic of Korea, Jan. 20-28, 2011, No. JCTVC-D393.

Zhou et al., "An interpolation method by predicting the direction of pixel texture changing trend for H.264/AVC intra prediction", Second International Symposium on Intelligent Information Technology Application, IEEE Computer Society, pp. 884-888.

Wiegand et al., "WD3: Working Draft 3 of High-Efficiency Video Coding", JCT-VC (Joint Collaborative Team on Video Coding of ITU-T SG16 WP3 and ISO/IEC JTC1/SC29/WG11) 5.Geneva, Switzerland, Mar. 16-23, 2011, No. JCTVC-E603, Part 1.

Wiegand et al., "WD3: Working Draft 3 of High-Efficiency Video Coding", JCT-VC (Joint Collaborative Team on Video Coding of ITU-T SG16 WP3 and ISO/IEC JTC1/SC29/WG11) 5. Geneva, Switzerland, Mar. 16-23, 2011, No. JCTVC-E603, Part 2.

Wiegand et al., "WD3: Working Draft 3 of High-Efficiency Video Coding", JCT-VC (Joint Collaborative Team on Video Coding of ITU-T SG16 WP3 and ISO/IEC JTC1/SC29/WG11) 5. Geneva, Switzerland, Mar. 16-23, 2011, No. JCTVC-E603. Part 3.

Wiegand et al., "WD3: Working Draft 3 of High-Efficiency Video Coding", JCT-VC (Joint Collaborative Team on Video Coding of ITU-T SG16 WP3 and ISO/IEC JTC1/SC29/WG11) 5. Geneva, Switzerland, Mar. 16-23, 2011, No. JCTVC-E603, Part 4.

\* cited by examiner

IMAGE DECODING APPARATUS ADAPTIVELY DETERMINING A SCAN PATTERN ACCORDING TO AN INTRA PREDICTION MODE

CROSS-REFERENCE TO RELATED APPLICATIONS

This application is a continuation application of U.S. application Ser. No. 13/624,826 filed on Sep. 21, 2012, which is a continuation application of International Application No. PCT/KR2011/005592 filed on Jul. 29, 2011, which claims priority to Korean Application No. 10-2010-0074462 filed on Jul. 31, 2010 and Korean Application No. 10-2011-0062603 filed Jun. 28, 2011, which applications are incorporated herein by reference.

TECHNICAL FIELD

The present invention relates to an image decoding apparatus, and more particularly, to an apparatus of generating a prediction block capable of minimize the amount of coding bits of a residual block.

BACKGROUND ART

In image compression methods such as Motion Picture Experts Group (MPEG)-1, MPEG-2, MPEG-4 and H.264/MPEG-4 Advanced Video Coding (AVC), one picture is divided into macroblocks to encode an image. Then, the respective macroblocks are encoded using inter prediction or intra prediction.

In intra prediction, a current block of a current picture is encoded not using a reference picture, but using values of pixels spatially adjacent to the current block. An intra prediction mode with little distortion is selected by comparing a prediction block generated using the adjacent pixel values with an original macroblock. Then, using the selected intra prediction mode and the adjacent pixel values, prediction values of the current block are calculated. Difference between the prediction values and pixels values of the original current block are calculated and then encoded through transform coding, quantization and entropy coding. The intra prediction mode is also encoded.

Intra prediction are generally classified into 4×4 intra prediction, 8×8 intra prediction and 16×16 intra prediction for luminance components and chrominance components.

In 16×16 intra prediction according to related art, there are four modes of a vertical mode, a horizontal mode, a direct current (DC) mode and a plane mode.

In 4×4 intra prediction according to related art, there are nine modes of a vertical mode, a horizontal mode, a DC mode, a diagonal down-left mode, a diagonal down-right mode, a vertical right mode, a vertical left mode, a horizontal-up mode and a horizontal-down mode.

Each prediction mode has indexed according to the frequency of use of the respective modes. The vertical mode that is mode 0 shows the highest possibility of being used most frequently for performing intra prediction on a target block, and the horizontal-up mode that is mode 8 shows the highest possibility of being used most infrequently.

According to H.264 standards, a current block is encoded using a total of 13 modes, that is, 4 modes of the 4×4 intra prediction and 9 modes of the 16×16 intra prediction. A bit stream of the current block is generated according to an optimal mode among these modes.

However, when some or all values of pixels adjacent to current block do not exist or are not already encoded, it is impossible to apply some or all of the intra prediction modes to the current block. Also, when there is a large difference between adjacent reference pixels, a difference between a prediction block and an original block becomes large. Therefore, the coding efficiency is degraded.

SUMMARY OF THE DISCLOSURE

The present invention is directed to an image decoding apparatus to minimize the amount of coding bits of a residual block.

One aspect of the present invention provides an apparatus including: an entropy decoder configured to receive an intra prediction mode and one-dimensional (1D) quantized coefficients, and to restore a quantized transform block by using the 1D quantized coefficients; an inverse scanner configured to inversely scan the 1D quantized coefficients in the unit of sub-block to generate a quantized transform block; an inverse quantizer configured to inversely quantize the quantized transform block using a quantization step size to generate a transform block; an inverse transformer configured to inversely transform the transform block to generate a residual block; an intra predictor configured to generate a prediction block corresponding to a current prediction block according to the intra prediction mode; and an adder configured to restore an original block by adding the residual block and the prediction block, wherein, when a size of the transform block is 8×8, the inverse scanner restores a plurality of sub-blocks by applying a first scan pattern determined according to the intra prediction mode to the 1D quantized coefficients, and restores the quantized transform block by applying a second scan pattern determined according to the intra prediction mode to the plurality of sub-blocks, wherein, when the intra prediction mode is a horizontal mode, the first and second scan patterns are set to a vertical scan, and wherein the intra predictor includes: a reference pixel generator configured to generate reference pixels using available reference pixels of a current prediction block when reference pixels do not exist; a reference pixel filter configured to adaptively filter reference pixels adjacent to the current prediction block based on the intra prediction mode and size information of the current prediction block; and a prediction block generator configured to generate a prediction block corresponding to the current prediction block according to the intra prediction mode.

Preferably, when the intra prediction mode is one out of a plurality predetermined number of intra prediction modes adjacent to the horizontal mode, the first scan pattern is the vertical scan.

Preferably, the plurality of sub-blocks are inversely scanned in a reverse direction.

Preferably, the quantization step size is determined per coding unit of a predetermined size.

DETAILED DESCRIPTION OF THE DISCLOSURE

Figure 1:
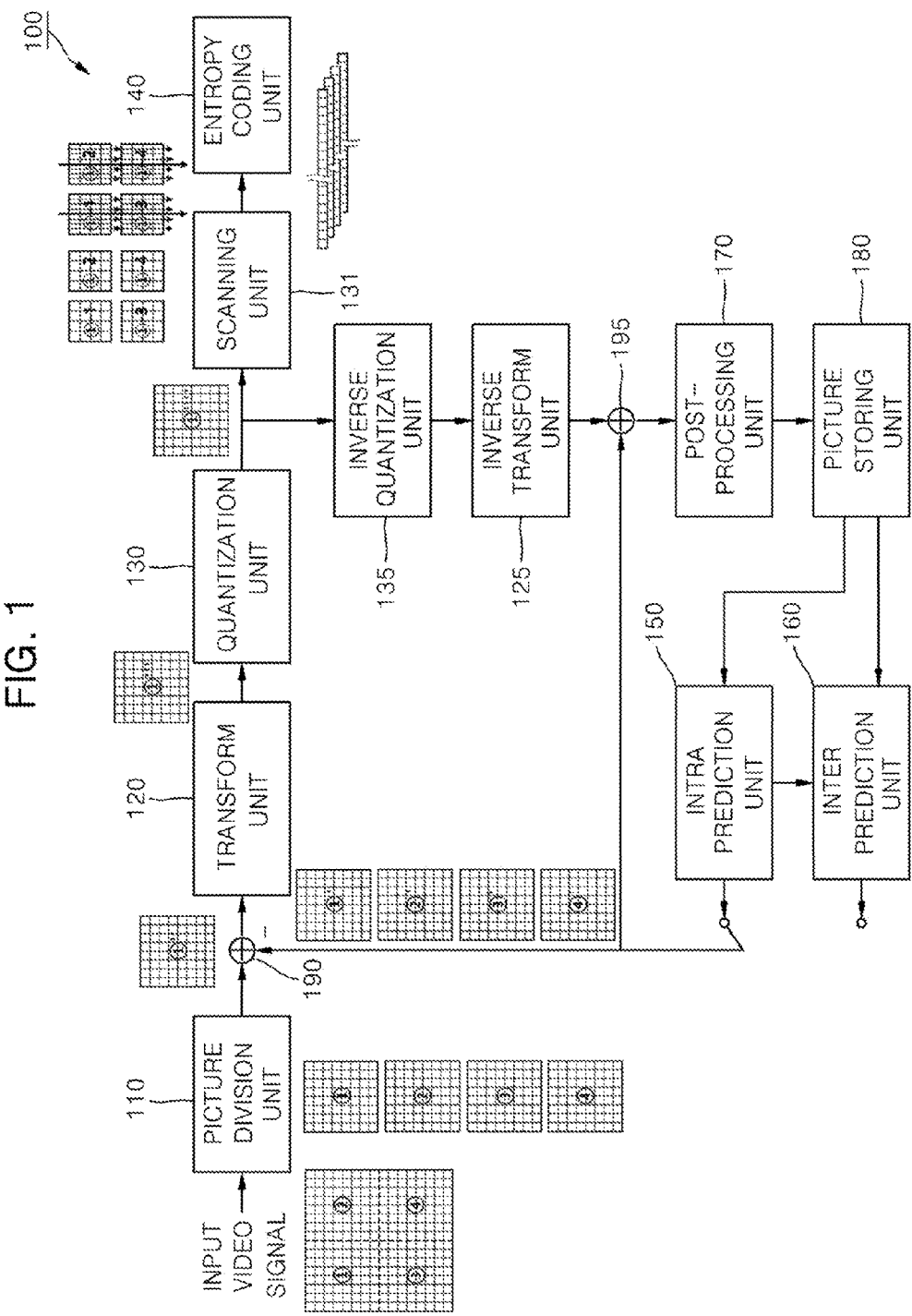
FIG. 1 is a block diagram illustrating a moving picture coding apparatus according to the present invention.

Hereinafter, various embodiments of the present invention will be described in detail with reference to the accompanying drawings. However, the present invention is not limited to the exemplary embodiments disclosed below, but can be implemented in various types. Therefore, many other modifications and variations of the present invention are possible, and it is to be understood that within the scope of the disclosed concept, the present invention may be practiced otherwise than as has been specifically described.

For image coding, each picture consists of one or more slices, and each slice consists of a plurality of coding units. Since an image of a high-definition (HD) grade or higher has many smooth regions, an image compression can be improved by encoding the image with coding units of various sizes.

A size of the coding unit according to the present invention may be 16×16, 32×32 or 64×64. A size of the coding unit may also be 8×8 or less. A coding unit of the largest size is referred to as a super macroblock (SMB). A size of SMB is indicated by a smallest size of the coding unit and depth information. The depth information indicates a difference value between the size of SMB and the smallest size of the coding unit.

Therefore, the size of coding unit to be used for coding pictures may be a size of SMB or sub-block of SMB. Sizes of coding units are default values or are indicated in a sequence header.

A SMB consists of one or more coding units. The SMB has a form of a recursive coding tree so as to include the coding units and a division structure of the coding units. When the SMB is not divided into four coding units, the coding tree may consist of information indicating that the SMB is not divided and one coding unit. When the SMB is divided into four coding units, the coding tree may consist of information indicating that the SMB is divided into four sub-coding trees. Likewise, each sub-coding tree has the same structure as the largest coding unit (LCU). However, a coding unit of the smallest coding unit (SCU) size is not divided into coding units.

Meanwhile, each coding unit in the coding tree is subjected to intra prediction or inter prediction in units of the coding unit itself or a sub-partition. A unit in which the intra prediction or the inter prediction is performed is referred to as a prediction unit. A size of the prediction unit may be 2 N×2 N or N×N for intra prediction. A size of the prediction unit may be 2 N×2 N, 2 N×N, N×2 N or N×N for inter prediction. Here, 2 N denotes horizontal and vertical lengths of a coding unit.

A coding unit includes a prediction mode of the prediction unit and size information on the prediction unit. To improve coding efficiency, the prediction mode and the size information may be combined and joint-coded. In this case, each coding unit includes a joint-coded prediction type.

A coding unit includes one or more additional information container. Each additional information container contains additional information of each prediction unit required for generating a prediction block of each prediction unit. In intra prediction, the additional information includes encoded intra prediction information. In inter prediction, the additional information includes encoded motion information. The motion information includes a motion vector and a reference picture index.

A coding unit also includes a residual signal container for containing encoded residual signals of the coding unit. The residual signal container contains one transform tree, one luminance residual signal carrier and two chrominance residual signal carriers. The transform tree indicates information indicating a division structure of transform units for the residual signal included in the coding unit. Also, the transform tree includes information indicating whether or not a residual signal of each transform unit is 0.

The residual signal container has a form of a recursive coding tree. Therefore, if the coding unit is not divided into four sub-coding unit, the residual signal container contains quantization information and encoded residual signal. If the coding unit is divided into four sub-coding units, the residual signal container contains quantization information and an additional four residual signal containers corresponding to four sub-coding units. Each additional residual signal container corresponding to each sub-coding unit has the same structure of the residual signal container of the coding unit, but does not contain the quantization information.

A prediction unit can be divided unequally. It may be more effective to unequally divide an image signal in a specific direction according to a boundary of an image and perform intra or inter prediction compressing a residual signal.

The simplest method is to divide a coding unit into two blocks using a straight line so as to extract statistical dependency of a prediction region on local topography. A boundary of an image is matched to straight line and divided. In this case, dividable directions may be limited to a predetermined number. For example, a method of dividing a block may be limited to four directions of horizontal, vertical, upward diagonal and downward diagonal directions. Also, the division may be limited to the horizontal and vertical directions only. The number of dividable directions can be three, five, seven and so on. The number of dividable directions may vary according to a size of the coding block. For example, for a coding unit of a large size, the number of dividable directions may be relatively increased.

In inter prediction, when one coding unit is divided into two prediction units for more adaptive prediction, motion estimation and motion compensation should be performed on each of prediction units. After prediction blocks are derived from the respective two prediction units divided from the one coding unit, the two prediction blocks may be added to generate the prediction block having the same size as the coding unit. In this case, to reduce difference between pixel values on both sides of a division boundary of the prediction block of the coding unit size, pixels located at the division boundary may be filtered. The prediction block may be generated such that the prediction blocks corresponding to the respective prediction units overlap, and the overlapping boundary portion may be smoothed to generate the one prediction block.

FIG. 1 is a block diagram illustrating a moving picture coding apparatus according to the present invention.

Referring to FIG. 1, a moving picture coding apparatus 100 according to the present invention includes a picture division unit 110, a transform unit 120, a quantization unit 130, a scanning unit 131, an entropy coding unit 140, an intra prediction unit 150, an inter prediction unit 160, an inverse quantization unit 135, an inverse transform unit 125, a post-processing unit 170, a picture storing unit 180, a subtracter 190 and an adder 195.

The picture division unit 110 analyzes an input video signal to divide each LCU of a picture into one or more coding units each of which has a predetermined size, determine prediction mode of each coding unit, and determines size of prediction unit per each coding unit. The picture division unit 110 sends the prediction unit to be encoded to the intra prediction unit 150 or the inter prediction unit 160 according to the prediction mode. Also, the picture division unit 110 sends the prediction units to be encoded to the subtracter 190.

The transform unit 120 transforms residual signals between an original block of an input prediction unit and a prediction block generated by the intra prediction unit 150 or the inter prediction unit 160. The residual block may have a size of coding unit. The residual block may be divided into optimal transform units and transformed. A transform matrix type may be adaptively determined according to a prediction mode and an intra prediction mode. The transform unit of the residual signal may be transformed by horizontal and vertical one-dimensional (1D) transform matrices. In inter prediction, one predetermined transform matrix type is applied. In intra prediction, there is a high possibility that the residual signals will have vertical directivity when the intra prediction mode of the current prediction unit is horizontal. Thus, a discrete cosine transform (DCT)-based integer matrix is applied to the vertical direction, and a discrete sine transform (DST) or Karhunen Loève transform (KLT)-based integer matrix is applied to the horizontal direction. When the intra prediction mode is vertical, a DST or KLT-based integer matrix is applied to the vertical direction, and a DCT-based integer matrix is applied to the horizontal direction. Also, in intra prediction, the transform matrix may be adaptively determined according to a size of the transform units.

The quantization unit 130 determines a quantization step size for quantizing transform coefficients of the residual block. The quantization step size is determined per coding unit of a predetermined size or more. The predetermined size may be 8×8 or 16×16. Using the determined quantization step size and a quantization matrix determined by a prediction mode, the transform coefficients are quantized. The quantization unit 130 uses quantization step sizes of one or more neighboring coding units to generate a quantization step size predictor of the current coding unit. The quantization unit 130 sequentially retrieves coding units in the following scan order; 1) a left coding unit of the current coding unit, 2) an above coding unit of the current coding unit, and 3) an above left coding unit of the current coding unit. Then, the quantization unit 130 generates the quantization step size predictor of the current coding unit using one or two valid quantization step sizes. For example, the first valid quantization step size encountered in the scan order may be determined as the quantization step size predictor. An average of first two valid quantization step size retrieved in the scan order may be determined as the quantization step size predictor when two or more quantization step sizes are valid, and one valid quantization step size is determined as the quantization step size predictor when only the one quantization step size is valid. When the quantization step size predictor is determined, a difference between the quantization step size and the quantization step size predictor is transmitted to the entropy coding unit 140.

When a slice is divided into coding units, there may be none of a left coding unit, an above coding unit and an above left coding unit of the current coding unit. But, there may be a previous coding unit of the current coding unit in the coding order in the maximum coding unit. Thus, coding units adjacent to the current coding unit and the previous coding unit may be candidates. In this case, the above scan order may be changed to the following scan order; 1) the left coding unit of the current coding unit, 2) the above coding unit of the current coding unit, 3) the above left coding unit of the current coding unit and 4) the previous coding unit of the current coding unit. The scan order may vary, or the above left coding unit may be omitted in the scan order.

The quantized transform block is provided to the inverse quantization unit 135 and the scanning unit 131.

The scanning unit 131 scans the quantized transform coefficients of the quantized transform block, thereby converting the quantized transform coefficients into 1D quantized transform coefficients. A coefficient scanning pattern is determined according to the intra prediction mode. The coefficient scanning pattern may also be determined according to the size of the transform unit.

The inverse quantization unit 135 inversely quantizes the quantized transform coefficients. The inverse transform unit 125 restores a residual block of the spatial domain from the inversely quantized transform coefficients. The adder 195 generates a reconstructed block by adding the residual block reconstructed by the inverse transform unit 125 and the prediction block from the intra prediction unit 150 or the inter prediction unit 160.

The post-processing unit 170 performs a de-blocking filtering process for removing blocking artifact generated in a reconstructed picture, an adaptive offset application process for complementing a difference between the reconstructed picture and the original image per pixel, and an adaptive loop filter process for complementing a difference between the reconstructed picture and the original image in a coding unit.

The de-blocking filtering process may be applied to a boundary between prediction units having a predetermined size or more and between transform units. The predetermined size may be 8×8. The de-blocking filtering process includes a step of determining a boundary to be filtered, a step of determining boundary filtering strength to be applied to the boundary, a step of determining whether or not to apply a de-blocking filter, and a step of selecting a filter to be applied to the boundary when it is determined to apply the de-blocking filter.

Whether or not to apply the de-blocking filter is determined according to i) whether or not the boundary filtering strength is greater than 0 and ii) whether or not a value indicating the difference between boundary pixels of P block and Q block is smaller than a first reference value determined according to a quantization parameter.

Two or more filters may exist. When an absolute value of a difference between two pixels adjacent to the block boundary is equal to or larger than a second reference value, a weak filter is selected. The second reference value is determined by the quantization parameter and the boundary filtering strength.

The adaptive offset application process is intended to reduce a difference (distortion) between a pixel subjected to the de-blocking filter and the original pixel. A picture or slice may be divided into a plurality of offset regions, and an offset mode may be determined per the offset region. There are four edge offset modes, two band offset modes and an offset non-application mode. According to each offset mode, pixels in each offset region are classified into a predetermined number of classes, and offset corresponding to the classified class is added to the pixel. In the case of an edge offset mode, a class of a current pixel is determined by comparing the current pixel value with pixel values of two or more pixels adjacent to the current pixel.

The adaptive loop filter process may be performed on the basis of a value obtained by comparing an original image and a reconstructed image to which the de-blocking filtering process or the adaptive offset application process is applied. An adaptive loop filter (ALF) is detected through one Laplacian activity value on the basis of a 4×4 block. The determined ALF can be applied to all pixels included in a 4×4 block or an 8×8 block. Whether or not to apply an ALF may be determined according to coding units. A size and coefficients of a loop filter may vary according to each coding unit. A slice header may include information indicating whether or not to apply the ALF to each coding unit, filter coefficient information and filter shape information. In the case of chrominance components, whether or not to apply the ALF may be determined in picture units. Unlike luminance, the loop filter may have a rectangular shape.

The picture storing unit 180 receives post-processed image data from the post-processing unit 170, and stores the image in picture units. A picture may be a frame or a field. The picture storing unit 180 has a buffer (not shown) capable of storing a plurality of pictures.

The inter prediction unit 160 performs motion estimation using one or more reference pictures stored in the picture storing unit 180, and determines a reference picture index indicating the reference pictures and a motion vector. According to the reference picture index and motion vector, the inter prediction unit 160 extracts a prediction block corresponding to a prediction unit to be encoded from a reference picture selected among a plurality of reference pictures stored in the picture storing unit 180 and outputs the extracted prediction block.

The intra prediction unit 150 performs intra prediction using reconstructed reference pixel values within a current picture. The intra prediction unit 150 receives the current prediction unit to be predictively encoded, selects one of a predetermined number of intra prediction modes, and performs intra prediction. The predetermined number of intra prediction modes may depend on the size of the current prediction unit. The intra prediction unit 150 adaptively filters reference pixels used to generate the intra prediction block. When some of reference pixels are not valid, it is possible to generate the reference pixels at the invalid positions using one or more valid reference pixels.

The entropy coding unit 140 entropy-codes the quantized transform coefficients from the quantization unit 130, intra prediction information received from the intra prediction unit 150, motion information received from the inter prediction unit 160, and so on.

Figure 2:
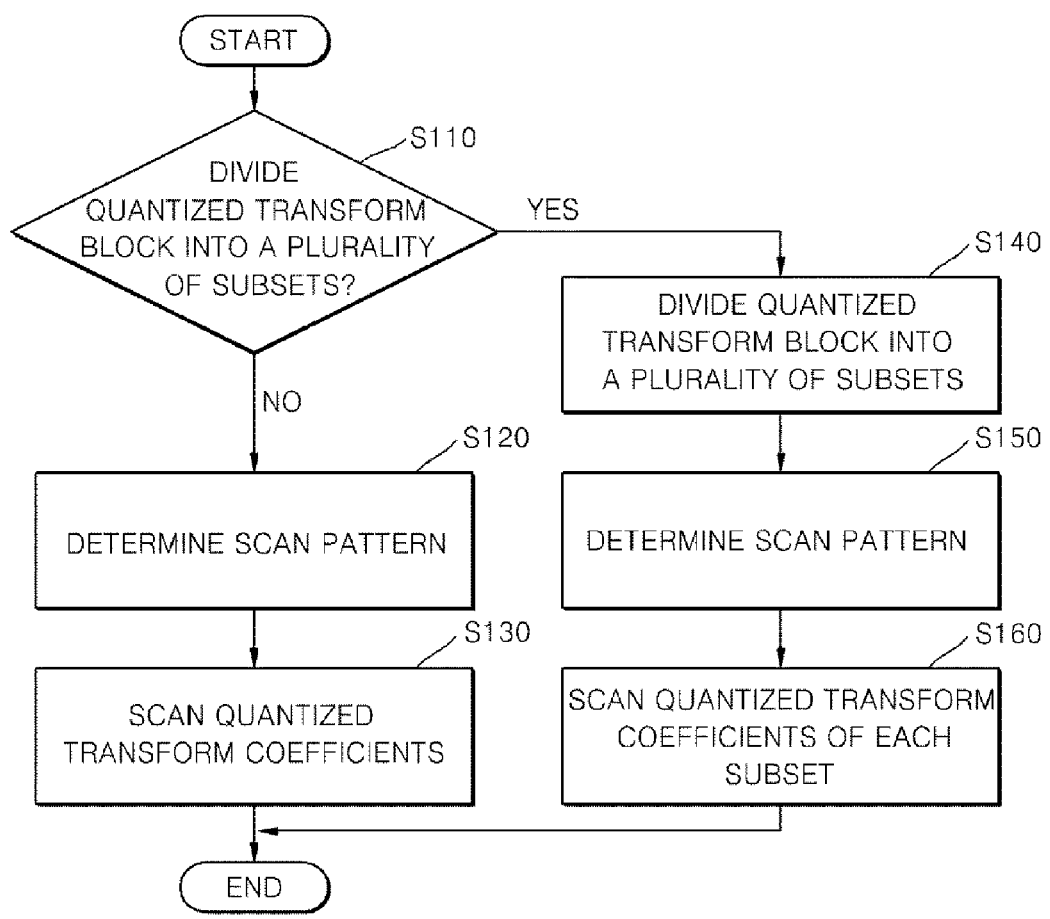
FIG. 2 is a flow chart illustrating an operation of a scanning unit according to the present invention.

FIG. 2 is a flow chart illustrating an operation of the scanning unit 131 according to the present invention.

It is determined whether the quantized transform block is divided into a plurality of subsets (S110). The determination is based on a size of the quantized transform block (that is, a size of the current transform unit). If the size of the current transform unit is larger than a first reference size, the quantized transform coefficients of the quantized transform block are divided into a plurality of subsets. The first reference size is 4×4 or 8×8. The first reference size may be transmitted to a decoder through a picture header or a slice header.

When the quantized transform block is not divided into a plurality of subsets, a scan pattern to be applied to the quantized transform block is determined (S120). The step S120 may be performed prior to the step S110 or regardless of the step S110.

The quantized coefficients of the quantized transform block are scanned according to the determined scan pattern (S130). The scan pattern is adaptively determined according to the prediction mode and the intra prediction mode. In inter prediction mode, only one predetermined scan pattern (e.g., zigzag scan) can be applied. In intra prediction mode, a scan pattern determined according to the intra prediction mode may be applied. For example, a horizontal scan is applied in a vertical intra prediction mode and a predetermined number of intra prediction modes adjacent to the vertical intra prediction mode. A vertical scan is applied in a horizontal intra prediction mode and a predetermined number of intra prediction modes adjacent to the horizontal intra prediction mode. The predetermined number varies according to a number of allowed intra prediction modes of a prediction unit or a size of a prediction block. For example, if the number of allowable directional intra prediction modes is 16, the predetermined number is 4. If the number of allowable directional intra prediction modes is 33, the predetermined number is 8. Meanwhile, Zigzag scan is applied to non-directional intra prediction modes. A non-directional mode may be a direct current (DC) mode or a planar mode.

If it is determined that the quantized transform block is divided into a plurality of subsets, the quantized transform block is divided into a plurality of subsets (S140). The plurality of subsets consist of one main subset and one or more residual subsets. The main subset is located at an upper left side and covers a DC coefficient, and the one or more residual subsets cover region other than the main subset.

A scan pattern to be applied to the subsets is determined (S150). A same scan pattern is applied to all the subsets. The scan pattern is adaptively determined according to the prediction mode and the intra prediction mode. The step S150 may be performed prior to the step S110 or regardless of the step S110.

When the size of the quantized transform block (that is, the size of the transform unit) is larger than a second reference size, the predetermined scan pattern (zigzag scan) may be applied to the quantized transform block. The second reference size is, for example, 8×8. Therefore, the step S150 is performed when the first reference size is smaller than the second reference size.

In inter prediction mode, only one predetermined scan pattern (e.g., zigzag scan) can be applied to each subset. In intra prediction mode, the scan pattern is adaptively determined as the same as the step S130.

The quantized transform coefficients of each subset are scanned according to the scan pattern (S160). The quantized transform coefficients in each subset are scanned in the reverse direction. That is, the quantized transform coefficients are scanned from a last non-zero coefficient to other non-zero coefficients according to the scan pattern, and entropy-coded.

The zigzag scan may be applied to scan the subsets. The subsets may be scanned beginning with the main subset to the residual subsets in a forward direction, or can be scanned in the reverse direction. A scan pattern for scanning the subsets may be set the same as a scan pattern for scanning the quantized transform coefficients.

An encoder transmits information capable of indicating a position of the last non-zero quantized coefficient of the transform unit to a decoder. The encoder also transmits information capable of indicating a position of the last non-zero quantized coefficient in each subset to the decoder.

Figure 3:
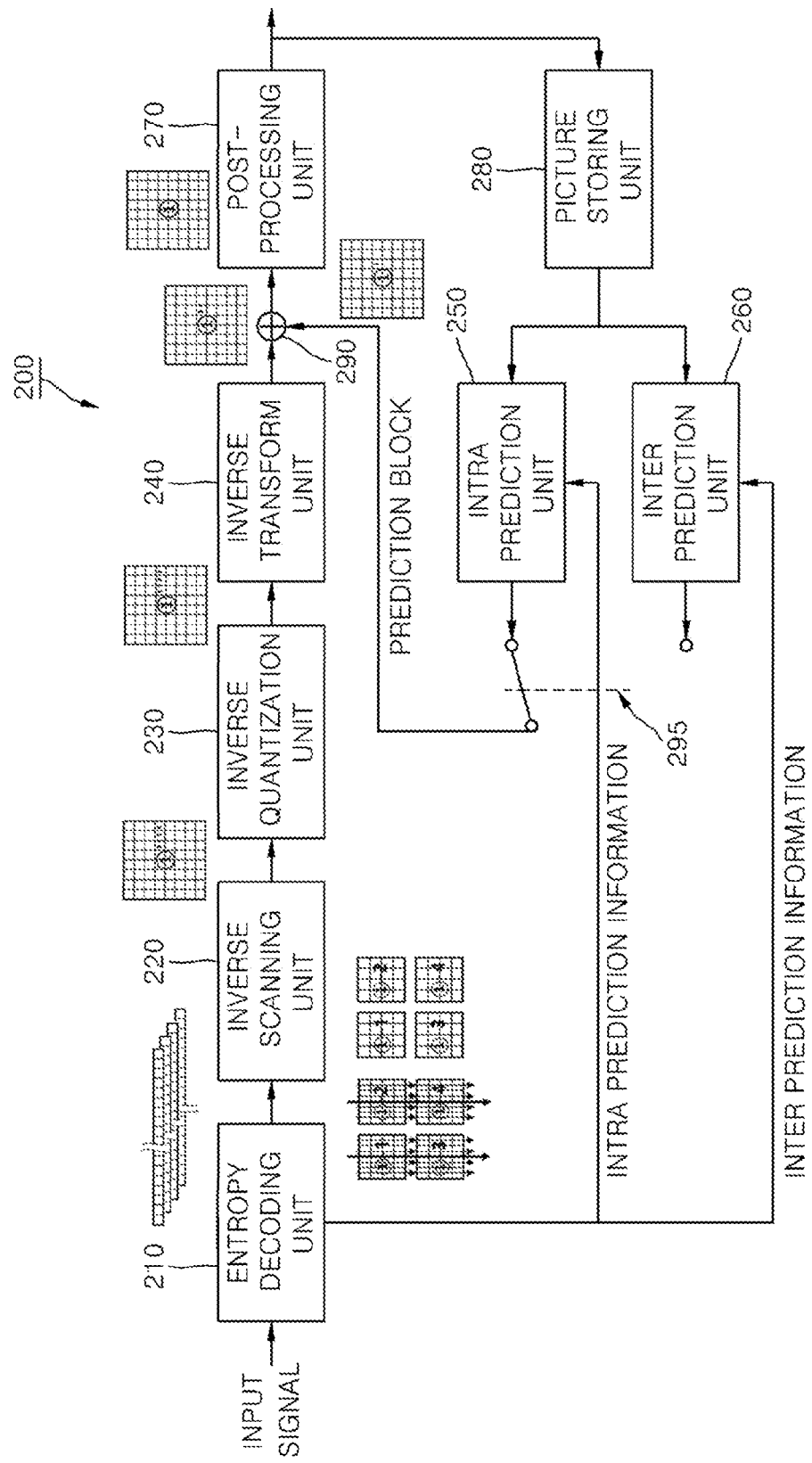
FIG. 3 is a block diagram illustrating a moving picture decoding apparatus according to the present invention.

FIG. 3 is a block diagram illustrating a moving picture decoding apparatus according to the present invention.

The moving picture decoding apparatus according to the present invention includes an entropy decoding unit 210 (alternatively referred to herein as an "entropy decoder"), an inverse scanning unit 220 (alternatively referred to herein as an "inverse scanner"), an inverse quantization unit 230 (alternatively referred to herein as an "inverse quantizer"), an inverse transform unit 240 (alternatively referred to herein as an "inverse transformer"), an intra prediction unit 250 (alternatively referred to herein as an "intra predictor"), an inter prediction unit 260, a post-processing unit 270, a picture storing unit 280, an adder 290 and a switch 295.

The entropy decoding unit 210 extracts intra prediction information, inter prediction information and quantized coefficients information from a received bit stream. The entropy decoding unit 210 transmits the inter prediction information to the inter prediction unit 260, intra prediction information to the intra prediction unit 250 and the quantized coefficients information to the inverse scanning unit 220.

The inverse scanning unit 220 converts the quantized coefficients information into two dimensional quantized transform block. One of a plurality of inverse scan patterns is selected for the conversion. The inverse scan pattern is selected based on at least one of the prediction mode and the intra prediction mode. An operation of the inverse scanning unit 220 is the same as the inverse operation of the scanning unit 131 of FIG. 1. For example, if a size of a transform unit to be decoded is larger than the first reference size, the quantized transform coefficients of each subset are inversely scanned according to the selected inverse scan pattern to generate a plurality of subsets and a quantized transform block having a size of the transform unit is generated using the plurality of subsets.

The inverse quantization unit 230 determines a quantization step size predictor of the current coding unit. The operation to determine the quantization step size predictor is same as the procedure of the quantization unit 130 of FIG. 1. The inverse quantization unit adds the determined quantization step size predictor and a received residual quantization step size to generate a quantization step size of the current coding unit. The inverse quantization unit 230 restores inverse quantized coefficients using a quantization matrix determined by the quantization step size. The quantization matrix varies according to the size of the current block and prediction mode.

The inverse transform unit 240 inversely transforms the inverse quantized block to restore a residual block. The inverse transform matrix to be applied to the inverse quantized block is adaptively determined according to the prediction mode and the intra prediction mode. The determination procedure of the inverse transform matrix is the same as the procedure in the transform unit 120 of FIG. 1.

The adder 290 adds the restored residual block and a prediction block generated by the intra prediction unit 250 or the inter prediction unit 260 to generate a reconstructed image block.

The intra prediction unit 250 restores the intra prediction mode of the current block based on the received intra prediction information, and generates a prediction block according to the restored intra prediction mode.

The inter prediction unit 260 restores reference picture indexes and motion vectors based on the received inter prediction information, and generated a prediction block using the reference picture indexes and the motion vectors. When the motion vector does not indicate a pixel position, the prediction block is generated using an interpolation filter.

The post-processing unit 270 operates the same as the post-processing unit 160 of FIG. 1

Figure 4:
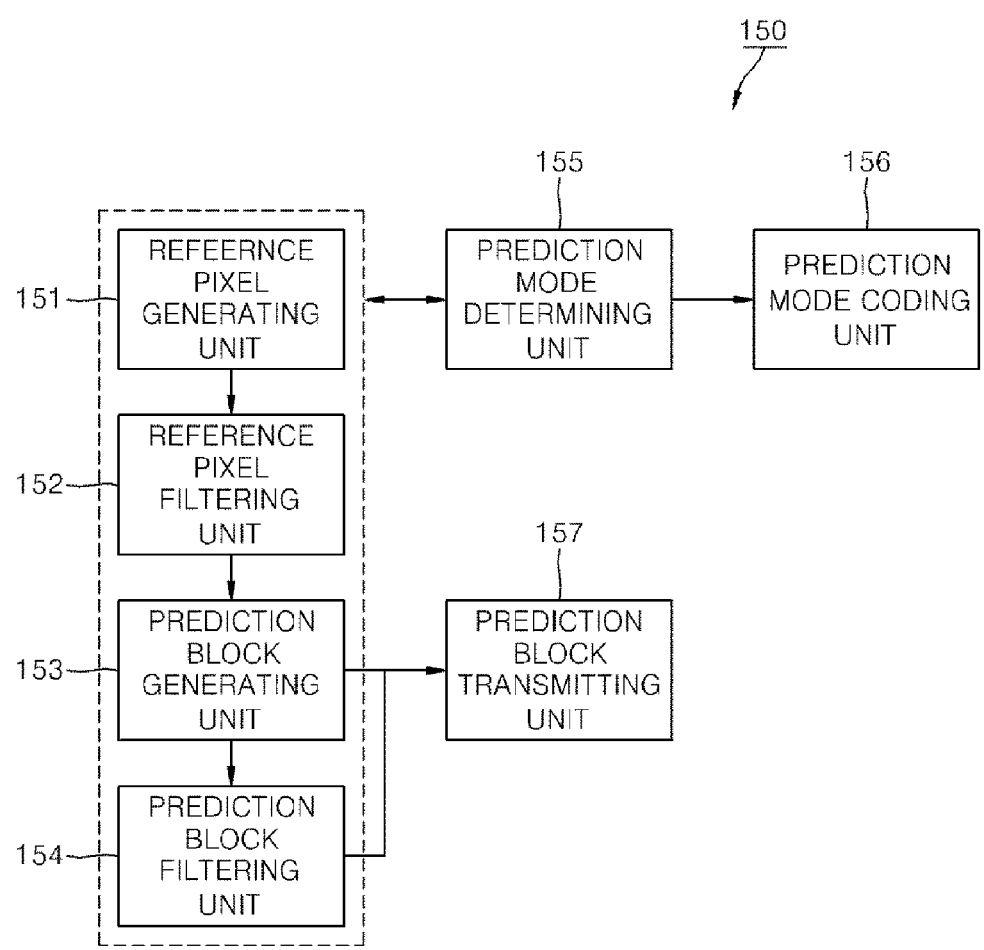
FIG. 4 is a block diagram illustrating an intra prediction unit according to the present invention.

FIG. 4 is a block diagram illustrating the intra prediction unit 150 of a moving picture coding unit 100 according to the present invention.

Referring to FIG. 4, the intra prediction unit 150 includes a reference pixel generating unit 151, a reference pixel filtering unit 152, a prediction mode determining unit 153, a prediction block generating unit 154, a prediction block filtering unit 155 and a prediction mode coding unit 156.

The reference pixel generating unit 151 determines that it is necessary to generate reference pixels for intra prediction, and generates reference pixels if it is necessary to generate the reference pixels.

Figure 5:
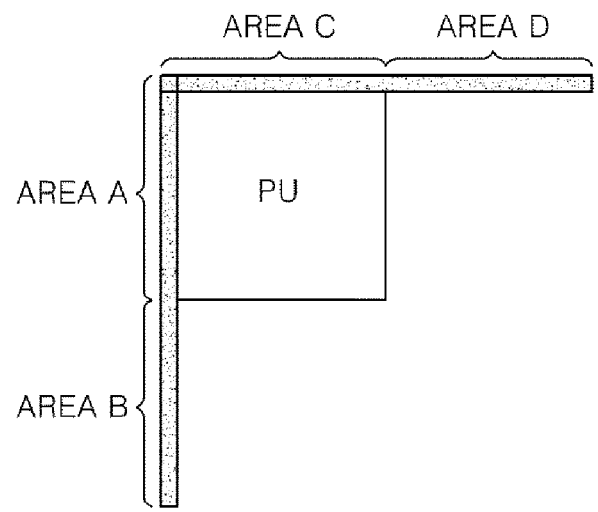
FIG. 5 is a conceptual diagram showing positions of reference pixels used for intra prediction according to the present invention.

FIG. 5 is a conceptual diagram showing positions of reference pixels used for intra prediction according to the present invention. As shown in FIG. 5, the reference pixels of the current prediction unit used for intra prediction consist of above reference pixels, left reference pixels and a corner reference pixel. The above reference pixels covering areas C and D are located at (x=0, . . . , 2L−1, y=−1), and the left reference pixels covering areas A and B are positioned at (x=−1, y=0, . . . , and 2M−1). Here, L is a width of the current prediction block, and M is a height of the current prediction block.

The reference pixel generating unit 151 determines whether the reference pixels are available or not. If one or more reference pixels are not available, the reference pixel generation unit 151 generates reference pixels using available reference pixel.

When left reference pixels or the above reference pixels are not available, the reference pixels are generated as follows. When the current prediction unit is located at the upper boundary of a picture or a slice, the above reference pixels covering areas C and D do not exist. When the current prediction unit is located at the left boundary of a picture or a slice, the left reference pixels covering areas A and B do not exist. In those cases, reference pixels are generated by copying the value of an available pixel closest to the unavailable pixel. That is, when the current prediction unit is located at the upper boundary of a picture or a slice, the above reference pixels can be generated by copying an uppermost left reference pixel. When the current prediction unit is located at the left boundary of a picture or a slice, the left reference pixels can be generated by copying a leftmost above reference pixel. The method may vary per sequence, picture or slice if necessary.

When some of the left reference pixels or the above reference pixels are not available, the reference pixels are generated as follows.

If the unavailable reference pixel exists in only one direction from the available pixels, the reference pixel is generated by copying the value of an available pixel closest to the unavailable pixel. For example, when the current block is located at the right boundary of a picture or a slice or a LCU, the reference pixels covering area D are not available. Also, when the current block is located at the below boundary of a picture or a slice or a LCU, the reference pixels covering area B are not available. The reference pixels are generated using two or more available pixels closest to the unavailable pixel.

If the unavailable reference pixel exists between the available pixels, the reference pixel is generated using two available reference pixels closest to the unavailable pixel in both sides. For example, when the current block is located at the upper boundary of a slice and the above left block of the current block is available, the reference pixels covering area C are not available, but the reference pixels covering areas A and D are available. The reference pixel is generated by averaging the two available reference pixels. But, linear interpolation may be used to generate the reference when the area covered by the unavailable reference pixels is large.

When all of the reference pixels are unavailable, the reference pixels are generated by using two or more pixels located inside of the prediction unit. For example, when the current block is located at the left upper boundary of a picture or a slice, all the reference pixels are unavailable.

Figure 6:
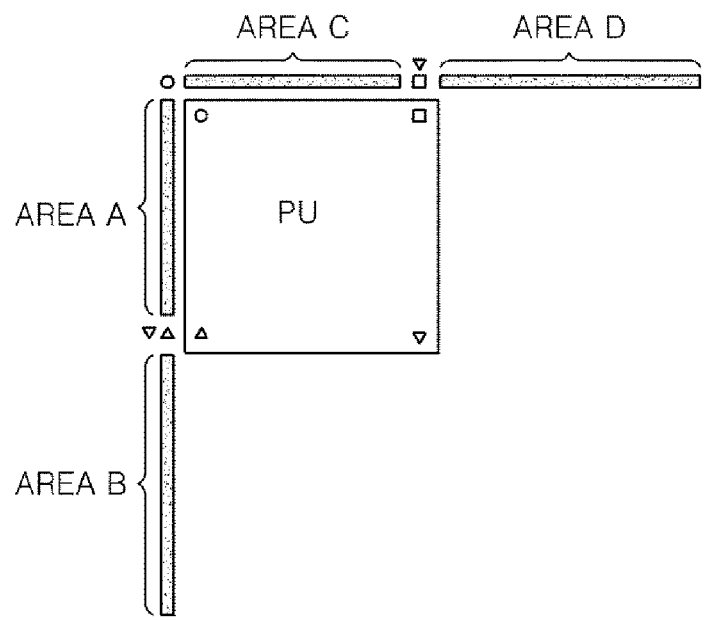
FIG. 6 a flow chart illustrating a process of generating reference pixels according to the present invention.

FIG. 6 is a flow chart illustrating a process of generating reference pixels according to the present invention.

The process of generating reference pixels using two pixels is as follows. A left above pixel (○) and one of a right above pixel (□), a left below pixel (Δ) and a right below pixel (Δ) may be used. When the left above pixel and the right above pixel are used, the reference pixels existing above the left above pixel and the right above pixel are generated by copying the left above pixel and the right above pixel and the copied reference pixels are used to generate reference pixels covering area C. The reference pixels are generated using an average or linear interpolation. The reference pixels covering D are generated using the right above pixel or a plurality of the generated above pixels. When the left above pixel and the left below pixel are used, the same method is applied. When the left above pixel and the right below pixel are used, the right below pixel is copied in horizontal direction and vertical direction to generate two corresponding reference pixels and then the residual reference pixels are generated as the same as described above.

The process of generating reference pixels using three pixels is as follows. A left above pixel, a right above pixel and a left below pixel may be used. The pixels are copied to generate reference pixels corresponding to the pixels. The residual reference pixels are generated as the same as described above.

The values of the pixels used to generate the reference pixels are transmitted to the decoder. To minimize the amount of bits to be transmitted, the value of the left above pixel and the difference between the value of the left above pixel and the value of other pixel. The value of the left above pixel may be a quantized value or be entropy-coded.

When a slice type is I, it is more effective to generate the reference pixels using two pixels.

Alternatively, the reference pixels are generated by copying pixels existing same positions of a reference picture. If there are not pixels existing same positions, nearest pixels are used to generate the reference pixels.

The reference pixel filtering unit 152 filters reference pixels of the current prediction unit. Low-pass filter is applied to smooth the difference between adjacent reference pixels. The low-pass filter may be a 3-tap filter [1, 2, 1] or a 5-tap filter [1, 2, 4, 2, 1].

The filter may be adaptively applied according to a size of the current block. If the size of the current block is equal to or smaller than a predetermined size, the filter is not applied. The predetermined size may be 4×4.

The filter may also be adaptively applied according to a size of the current block and intra prediction mode.

In the horizontal mode or the vertical mode, a prediction pixel is generated using one reference pixel. Therefore, a filter is not applied in the horizontal mode and the vertical mode. In the DC mode, a prediction pixel is generated using average of the reference pixels. Therefore, a filter is not applied in the DC mode because the prediction pixel is not affected by the difference between adjacent pixels.

In the intra prediction mode 3, 6 or 9 having a direction of 45° with reference to the horizontal or vertical direction, a filter is applied regardless of the size of the prediction unit or applied when the current block is larger than a smallest prediction unit. A first filter may be applied to a prediction unit having a size smaller that a predetermined size, and a second filter stronger than the first filter may be applied to a prediction unit having a size equal to or larger than the predetermined size. The predetermined size may be 16×16.

In the intra prediction modes other than the vertical mode, the horizontal mode, the DC mode and the intra prediction mode 3, 6 and 9, a filter may be adaptively applied according to the size of the current prediction unit and the intra prediction mode.

The prediction block generating unit 153 generates a prediction block corresponding to the intra prediction mode. The prediction block is generated using the reference pixels or linear combination of the reference pixels based on the intra prediction mode. The reference pixels to be used to generate the prediction block may be filtered by the reference pixel filtering unit 152.

The prediction block filtering unit 154 adaptively filters the generated prediction block according to the intra prediction mode to minimize the residual signal between a prediction block and a current block to be encoded. The difference between a reference pixel and a prediction pixel adjacent to the reference pixel varies according to the intra prediction mode. Therefore, filtering of the prediction pixel adjacent to the reference pixel enables the difference to be decreased.

In the DC mode, the difference may be large because the prediction pixel is an average value of the reference pixels. Therefore, the prediction pixels of upper line and left line which are adjacent to the reference pixels are filtered using the reference pixels. The upper left prediction pixel adjacent two reference pixels is filtered by 3-tap filter. The other prediction pixels adjacent to one reference pixel are filtered by 2-tap filter.

In the vertical mode (mode 0), the diagonal down-left mode (mode 6), and the intra prediction modes 22, 12, 23, 5, 24, 13, 25 between the mode 0 and mode 6, a prediction block is generated using only above reference pixels. Therefore, the difference between a reference pixel and a prediction pixel adjacent to the reference pixel may be larger as the position of the prediction pixel goes down.

Also, in the horizontal mode (mode 1), the diagonal up-right mode (mode 9), and the intra prediction modes 30, 16, 31, 8, 32, 17, 33 between the mode 1 and mode 9, a prediction block is generated using only left reference pixels. Therefore, the difference between a reference pixel and a prediction pixel adjacent to the reference pixel may be larger as the position of the prediction pixel goes right.

Accordingly, some prediction pixels of the prediction block may be filtered for compensate the difference in directional intra prediction mode other than DC mode.

In the mode 6, all or some prediction pixels adjacent to the reference pixel are filtered. The some prediction pixels may be N/2 lower pixels adjacent to the reference pixel. N is the height of the prediction block.

In the mode 9, all or some prediction pixels adjacent to the reference pixel are filtered. The some prediction pixels may be M/2 right pixels adjacent to the reference pixel. M is the width of the prediction block.

In a predetermined number of directional intra prediction modes which are closer to the mode 6 and exist between mode 0 and mode 6, the same filtering method as in the mode 6 can be used. The same filtering method can be used in the directional intra prediction modes between mode 1 and mode 9.

Meanwhile, the filter is adaptively applied according to the size of the current prediction unit. For example, a filtered is not applied to a predetermined size which is determined by the intra prediction mode.

The prediction block filtering unit 154 may be integrated into the prediction block generating unit 153. Alternatively, the prediction block is generated by using the combination of the generating operation and the filtering operation.

The intra prediction mode determining unit 155 determines the intra prediction mode of a current prediction unit using reference pixels. The intra prediction mode determining unit 155 selects one intra prediction mode in which the amount of coding bits of a residual block is minimized as the intra prediction mode of the current prediction unit. The prediction block may be generated by filtered reference pixels or may be a block filtered by the prediction block filtering unit 154.

The prediction block transmitting unit 157 transmits the prediction block generated based on the intra prediction mode to the subtracter 190.

The intra prediction mode coding unit 156 encodes the intra prediction mode of the current prediction unit determined by the intra prediction mode determining unit 155. The intra prediction mode coding unit 156 may be integrated into the intra prediction unit 150 or into the entropy coding unit 140.

The intra prediction mode coding unit 156 encodes the intra prediction mode of the current prediction unit using an above intra prediction mode of the current prediction unit and a left intra prediction mode of the current prediction unit.

First, the above intra prediction mode and the left intra prediction mode of the current prediction unit are derived. When there exist a plurality of above prediction units of the current prediction unit, the plurality of above prediction units are scanned in a predetermined direction (e.g., from right to left) to determine the intra prediction mode of a first valid prediction unit as an above intra prediction mode. Also, when there exist a plurality of left prediction units of the current prediction unit, the plurality of left prediction units are scanned in a predetermined direction (e.g., from bottom to top) to determine the intra prediction mode of a first valid prediction unit as a left intra prediction mode. Alternatively, among a plurality of valid prediction units, the intra prediction mode of a valid prediction unit having the lowest intra prediction mode number may be set as an above intra prediction mode.

When the above intra prediction mode or the left intra prediction mode is not available, the DC mode (mode 2) may be set to as the above intra prediction mode or the left intra prediction mode. The above intra prediction mode or the left intra prediction mode is treated as unavailable when there does not exist a corresponding prediction unit.

Next, the above intra prediction mode or the left intra prediction mode is converted into one of the permissible modes when the above intra prediction mode number or the left intra prediction mode number is equal to or greater than the number of intra prediction modes permissible for the current prediction unit. For example, when the size of the current prediction unit is 4×4, the intra prediction mode of the valid intra prediction mode candidate is converted into one of nine modes (mode 0 to mode 8), and when the size of the current prediction unit is 64×64, the intra prediction mode value of the valid intra prediction mode candidate is converted into one of three modes (mode 0 to mode 2).

Next, if the intra prediction mode of the current prediction unit is the same as any one of the above and left intra prediction modes, a flag indicating that the intra prediction mode of the current prediction unit is the same as any one of the above and left intra prediction modes and a flag indicating one of the above and left intra prediction modes are transmitted to the decoder. In this case, if the above and left intra prediction modes are same, the flag indicating one of the above and left intra prediction modes can be omitted. Also, if only one of the above and left intra prediction modes is available, the flag indicating one of the above and left intra prediction modes can be omitted.

But, if the intra prediction mode of the current prediction unit is not the same as any one of the above and left intra prediction modes, the intra prediction mode number of the current prediction unit is compared with the above intra prediction mode number and the left intra prediction mode number. A mode change value is counted. The mode change value is the number of intra prediction modes having intra prediction mode number that are not greater than the intra prediction mode number of the current prediction unit. Then, the intra prediction mode of the current prediction unit is changed using the mode change value. The changed intra prediction mode is determined as final intra prediction mode information to be transmitted.

A table used for encoding the final intra prediction mode is selected according to whether the above and the left intra prediction modes are same or not.

Figure 7:
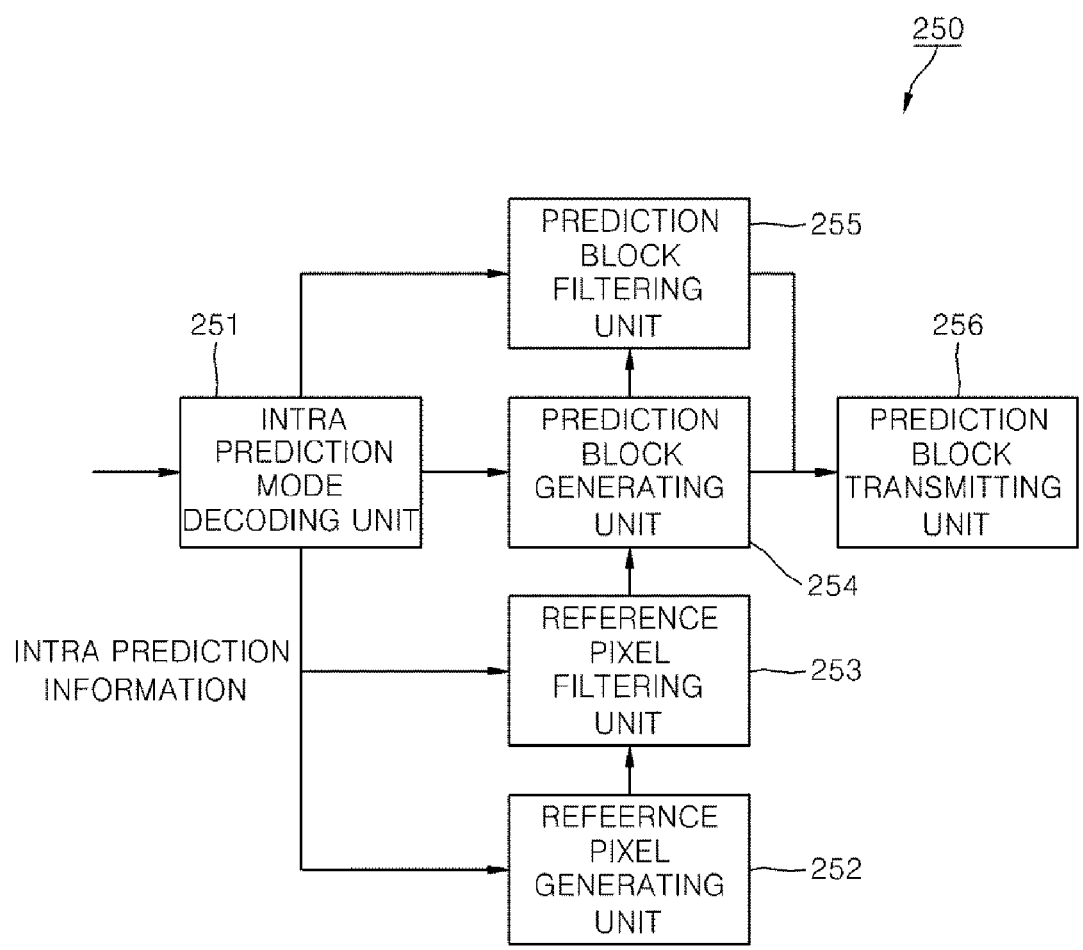
FIG. 7 is a block diagram illustrating an intra prediction unit of a moving picture decoding apparatus according to the present invention.

FIG. 7 is a block diagram illustrating the intra prediction unit 250 of a moving picture decoding apparatus 200 according to the present invention.

The intra prediction unit 250 according to the present invention includes a intra prediction mode decoding unit 251, a reference pixel generating unit 252 (alternatively referred to herein as a "reference pixel generator"), a reference pixel filtering unit 253 (alternatively referred to as "reference pixel filter"), a prediction block generating unit 254 (alternatively referred to herein a a "prediction block generator"), a prediction block filtering unit 255 and a prediction block transmitting unit 256.

The intra prediction mode decoding unit 251 restores the intra prediction mode of a current prediction unit as follows.

First, the intra prediction mode decoding unit 251 receives additional information included in the additional information container for generate a prediction block. The additional information includes a prediction flag and residual prediction information. The prediction flag indicates whether the prediction mode of the current prediction unit is the same as one of prediction modes of adjacent prediction blocks. The residual prediction information includes information determined by the prediction flag. If the prediction flag is 1, the residual prediction information may include an index of the intra prediction mode candidate. The index of the intra prediction mode designates the intra prediction mode candidate. If the prediction flag is 0, the residual information may include residual intra prediction mode number.

Intra prediction mode candidates of the current prediction unit are derived. The intra prediction mode candidates are derived using intra prediction modes of adjacent prediction units. For example, the adjacent prediction units are an above prediction unit and a left prediction unit. When there are a plurality of above prediction units or a plurality of left prediction units, the intra prediction mode of the above or left prediction unit is determined as the same as described in the operation of the intra prediction encoding unit 156 of the encoding apparatus 100. Also, when the mode number of a valid intra prediction mode candidate is equal to or greater than the number of intra prediction modes permissible for the current prediction unit, the valid intra prediction mode candidate is converted into one of the permissible modes as described in the intra prediction encoding unit 156.

Next, if the received prediction mode indicates that the intra prediction mode of the current prediction unit is equal to one of the intra prediction candidates and the index of the intra prediction mode candidate exists, the intra prediction mode indicated by the index is set as the intra prediction mode of the current prediction unit.

If the received prediction mode indicates that the intra prediction mode of the current prediction unit is equal to one of the intra prediction candidates and the index of the intra prediction mode candidate does not exist, the one valid intra prediction mode is set as the intra prediction mode of the current prediction unit.

If the received prediction mode indicates that the intra prediction mode of the current prediction unit is not equal to any one of the intra prediction candidates, the intra prediction mode of the current prediction unit is restored by comparing the residual intra prediction mode number and the mode numbers of the valid intra prediction mode candidates.

The reference pixel generating unit 252 generates reference pixels using the same method as described in the reference pixel generating unit 151 of the coding apparatus 100. But, the reference pixel generating unit 252 may generate reference pixels only when the reference pixels used for generating a prediction block and determined by the intra prediction mode are not available.

The reference pixel filtering unit 253 adaptively filters the reference pixels based on the intra prediction mode and a size of the prediction block. The filtering condition and method are same as those of the reference pixel filtering unit 152 of the coding apparatus 100.

The prediction block generating unit 254 generates a prediction block using the reference pixels according to the restored intra prediction mode.

The prediction block filtering unit 255 adaptively filters the prediction pixel according to the restored intra prediction mode. The filtering operation is the same as that of the prediction block filtering unit 154 of the coding apparatus 100.

The prediction block transmitting unit 256 transmits a prediction block received from the prediction block generator 254 or the prediction block filtering unit 255 to the adder 290.

The invention claimed is:

1. An image decoding apparatus, comprising:
   an entropy decoder configured to restore an intra prediction mode and one-dimensional (1D) quantized coefficients;
   an inverse scanner configured to inversely scan the 1D quantized coefficients in the unit of sub-block to generate a quantized transform block;
   an inverse quantizer configured to inversely quantize the quantized transform block using a quantization step size to generate a transform block;
   an inverse transformer configured to inversely transform the transform block to generate a residual block;
   an intra predictor configured to generate a prediction block corresponding to a current prediction block according to the intra prediction mode; and
   an adder configured to restore an original block by adding the residual block and the prediction block,
   wherein the inverse scanner restores a plurality of sub-blocks, which are generated by an encoder that divides the quantized transform block into the plurality of sub-blocks after quantizing the transform block when a size of the transform block is 8×8, by applying a first scan pattern determined according to the intra prediction mode to the 1D quantized coefficients, and restores the quantized transform block by applying a second scan pattern determined according to the intra prediction mode to the plurality of sub-blocks,
   wherein the first scan pattern is a scan order applied to the 1D quantized coefficients, and the second scan pattern is a scan order applied to each sub-block of the plurality of sub-blocks,
   wherein, when the intra prediction mode is a horizontal mode, the second scan pattern is a vertical scan, and
   wherein the intra predictor includes:
   a reference pixel generator configured to generate reference pixels using available reference pixels of the current prediction block when reference pixels do not exist;
   a reference pixel filter configured to adaptively filter reference pixels adjacent to the current prediction block based on the intra prediction mode and size information of the current prediction block; and
   a prediction block generator configured to generate a prediction block corresponding to the current prediction block according to the intra prediction mode.

2. The apparatus of claim 1, wherein, when the intra prediction mode is one out of a predetermined number of intra prediction modes adjacent to the horizontal mode, the first scan pattern is the vertical scan.

3. The apparatus of claim 1, wherein the restored plurality of sub-blocks are inversely scanned in a reverse direction.

4. The apparatus of claim 1, wherein the quantization step size is determined per coding unit of a predetermined size.

* * * * *